United States Patent
Yeh et al.

(10) Patent No.: US 12,093,392 B2
(45) Date of Patent: Sep. 17, 2024

(54) ELECTRONIC-DEVICE CONTROL SYSTEM AND ELECTRONIC-DEVICE CONTROL METHOD

(71) Applicant: Coretronic Corporation, Hsin-Chu (TW)

(72) Inventors: Tsung-Hsin Yeh, Hsin-Chu (TW); Hao-Chang Tsao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 392 days.

(21) Appl. No.: 17/407,169

(22) Filed: Aug. 19, 2021

(65) Prior Publication Data

US 2022/0067163 A1   Mar. 3, 2022

(30) Foreign Application Priority Data

Aug. 28, 2020   (CN) .......................... 202010885020.7

(51) Int. Cl.
  *G06F 21/57*   (2013.01)
  *G06F 8/65*   (2018.01)
  *G06F 13/42*   (2006.01)

(52) U.S. Cl.
  CPC .............. *G06F 21/572* (2013.01); *G06F 8/65* (2013.01); *G06F 13/4282* (2013.01); *G06F 2213/0042* (2013.01); *G06F 2221/034* (2013.01)

(58) Field of Classification Search
  None
  See application file for complete search history.

(56) References Cited

U.S. PATENT DOCUMENTS 6,601,124 B1 *  7/2003  Blair ................... G06F 13/4068
                                                   710/316
8,069,329 B1 * 11/2011  Tang ................ H03K 19/17756
                                                   711/170

(Continued)

FOREIGN PATENT DOCUMENTS

CN       201060402       5/2008
CN       101414454       4/2009

(Continued)

OTHER PUBLICATIONS

"Office Action of China Counterpart Application", issued on Nov. 17, 2023, p. 1-p. 8.

(Continued)

*Primary Examiner* — Eric Coleman
(74) *Attorney, Agent, or Firm* — JCIPRNET

(57) ABSTRACT

An electronic-device control system and an electronic-device control method are provided. The electronic-device control system includes an electronic device having multiple pogo pads acting as an interface and a control device performing at least one preset operation on the electronic device. The control device includes: a pogo-pin module, including multiple pogo pins corresponding to the pogo pads to form a one-to-one correspondence to be connected via contact or disconnected; and a signal transfer unit, receiving from an external computer a second specification signal converted from a first specification signal, and transmitting the second specification signal to the corresponding pogo pin among the multiple pogo pins. A special firmware communication interface is configured by adapting the electronic-device control system and the electronic-device control method to update or control the electronic device, protecting the electronic device from malicious updates.

15 Claims, 5 Drawing Sheets

(56) References Cited

U.S. PATENT DOCUMENTS

| | | | |
|---|---|---|---|
| 8,560,996 B1* | 10/2013 | Brebner | G06F 30/34 |
| | | | 716/117 |
| 2004/0181731 A1* | 9/2004 | Rajsuman | G06F 11/263 |
| | | | 714/747 |
| 2008/0054917 A1 | 3/2008 | Henson et al. | |
| 2010/0134127 A1 | 6/2010 | Breinlinger et al. | |
| 2011/0193584 A1* | 8/2011 | Roberts | G01R 31/2834 |
| | | | 324/756.05 |
| 2012/0026018 A1* | 2/2012 | Lin | G06F 13/4068 |
| | | | 341/26 |
| 2014/0359477 A1* | 12/2014 | Chen | H04L 67/1078 |
| | | | 715/748 |
| 2015/0113179 A1* | 4/2015 | Chen | G06F 11/3051 |
| | | | 710/16 |
| 2017/0115713 A1* | 4/2017 | Shin | G06F 3/03545 |
| 2017/0163074 A1* | 6/2017 | Kimura | H02J 50/40 |
| 2019/0196552 A1* | 6/2019 | Wang | G06F 1/1616 |
| 2019/0218060 A1 | 7/2019 | Koba et al. | |
| 2019/0391703 A1* | 12/2019 | Tang | G06F 3/0485 |
| 2020/0265001 A1 | 8/2020 | Lee et al. | |

FOREIGN PATENT DOCUMENTS

| | | |
|---|---|---|
| CN | 102970502 | 3/2013 |
| CN | 203618046 | 5/2014 |
| CN | 104884963 | 9/2015 |
| CN | 109839582 | 6/2019 |
| TW | 201428302 | 7/2014 |
| TW | 201815344 | 5/2018 |

OTHER PUBLICATIONS

"Search Report of Europe Counterpart Application", issued on Jan. 14, 2022, p. 1-p. 7.

Benchoff, "Mr Robot Badge," HACKADAY.IO, retrived from the Internet on Dec. 17, 2021: https://web.archive.org/web/20200622073854/https://hackaday.io/project/18508-mr-robot-badge.

Benchoff, "Mr Robot Badge," HACKADAY.IO, retrived from the Internet on Dec. 20, 2021: https://web.archive.org/web/20190420233505/https://hackaday.io/project/18508/logs.

* cited by examiner

ELECTRONIC-DEVICE CONTROL SYSTEM AND ELECTRONIC-DEVICE CONTROL METHOD

CROSS-REFERENCE TO RELATED APPLICATION

This application claims the priority benefit of China application serial no. 202010885020.7, filed on Aug. 28, 2020. The entirety of the above-mentioned patent application is hereby incorporated by reference herein and made a part of this specification.

BACKGROUND

Technical Field

The disclosure relates to an electronic-device control system and an electronic-device control method.

Description of Related Art

Currently, the general method of updating the firmware of electronic devices is to update the firmware in a way that is fast, convenient, and mass-friendly. To achieve that, the communication interface for updating the firmware usually adopts specifications like Universal Serial Bus (USB), Recommended Standard-232 (RS232) for serial communication transmission of data, the network cable connector Registered Jack 45 (RJ45), or other wired update methods. However, when an electronic device is applied in special fields, such as projectors for cars, the car manufacturers have higher security demands for firmware updates for the projectors to prevent external malicious devices from updating the car projectors. Therefore, to update the car projectors, a special communication interface is in need.

Nevertheless, as the general firmware communication interface needs to be provided with an exposed connector, such as a USB connector, which may be easily broken when plugged or unplugged, the hardware of the car projector may also be damaged. In addition, when the car projector communicates with external devices using its firmware communication interface, it is necessary to weld connectors such as USB, RS232, RJ45, etc., upon it, which increases the manufacturing costs and the manufacturing processes. Furthermore, when the car projector is equipped with USB, RS232, RJ45, and other connectors, additional holes also need to be provided in the car projector body, causing the car projector to have poor resistance against dust and water. Accordingly, connectors such as USB, RS232, and RJ45 are also not suitable for electronic devices disposed in a stricter product environment (such as an automobile).

Generally, the aforementioned firmware has a larger area of the communication interface. For example, connectors such as USB, RS232, RJ45, etc. of an electronic device usually occupy a larger area. Moreover, since these firmware communication interfaces are compatible with the connectors commonly seen on the market, it is easy for ordinary people to access the electronic device through these interfaces, putting the firmware of the electronic device in danger of malicious updates.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

In this light, the present disclosure provides an electronic-device control system and an electronic-device control method, capable of solving at least one of the above technical issues. Also, by configuring a special firmware communication interface on the electronic device such as a car projector, the electronic device may be updated or controlled through the interface, which also protects the electronic device from malicious updates.

Other objectives and advantages of the disclosure may be further illustrated by the technical features broadly embodied and described as follows.

To achieve one, part, or all of the above objectives or other objectives, the present disclosure provides an electronic-device control system, including an electronic device having multiple pogo pads adapted as an interface and a control device for performing at least one preset operation on the electronic device. The control device includes: a pogo-pin module, including multiple pogo pins, which correspond to the pogo pads to form a one-to-one correspondence, and the correspondence may be connected via contact or disconnected; and a signal transfer unit, which receives from an external computer a second specification signal which is converted from a first specification signal, and transmitting the second specification signal to the corresponding pogo pin among the multiple pogo pins.

To achieve one, part, or all of the above objectives or other objectives, the present disclosure further provides an electronic-device control method for controlling an electronic device having the pogo pads adapted as the interface. The electronic-device control method includes: providing a control device having multiple pogo pins, the control device adapted to perform at least one preset operation on the electronic device; forming via the control device a one-to-one correspondence between the multiple pogo pins and multiple pogo pads, in which the correspondence may be connected via contact or disconnected; and receiving from outside the control device a second specification signal converted from a first specification signal, and transmitting the second specification signal to the corresponding pogo pin among the multiple pogo pins.

In summary, the pogo pins and the pogo pads may be configured into a firmware communication interface through the electronic-device control system and the electronic-device control method to update the firmware of the electronic device. Such configuration of the firmware communication interface provides the electronic device security and protects the electronic device from malicious updates. Furthermore, since the pogo pads and the pogo pins are adapted as the interface, there is no need to provide additional holes on the body of the electronic device, and thus the disclosure also provide the dust-proof and waterproof functions for the electronic device to be suitable for a strict environment.

Other objectives, features, and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting.

The present disclosure provides an electronic device applied to a special field (such as a car projector), and the electronic device may be configured with a special firmware communication interface to update or control the electronic device, so as to avoid the issues of security and applicability arising from the conventional communication interface.

Here, the special firmware communication interface of the electronic device combines a mechanical component of pogo pads and pogo pins with its control circuit. Only when the electronic device is in need of updates or performing other control operations, the pogo pins are then combined with the electronic device to establish a wired communication connection, through which the firmware of the electronic device may be updated or controlled.

Figure 1:
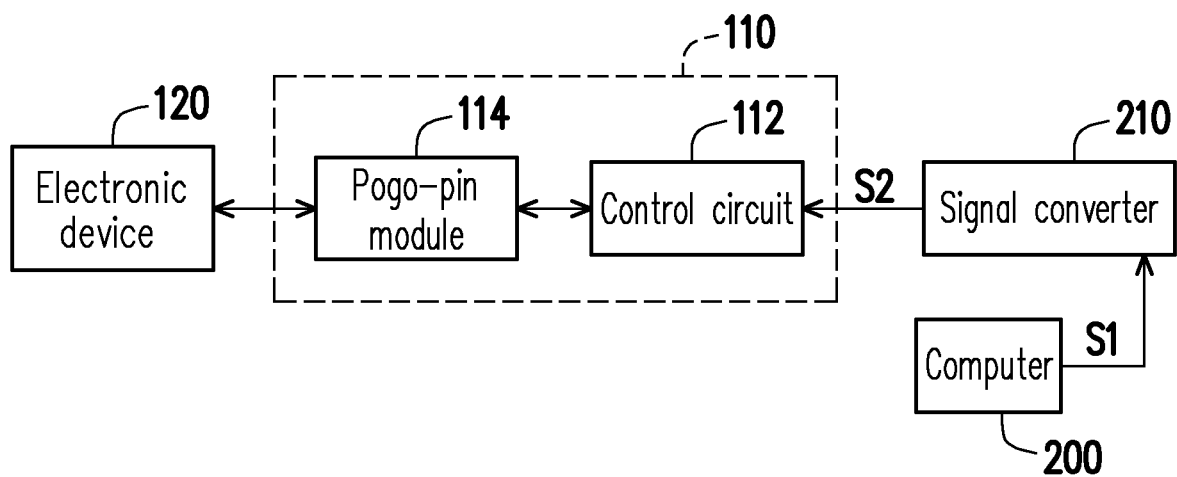
FIG. 1 is a block diagram of an electronic-device control system according to an embodiment of the disclosure.

FIG. 1 is a block diagram of an electronic-device control system according to an embodiment of the disclosure. As shown in FIG. 1, the electronic-device control system 100 at least includes an electronic device 120 and a control device 110. The control device 110 and the electronic device 120 may be coupled through an interface, and receive a signal from external devices (a computer 200 and a signal converter 210) to perform operations on the electronic device 120 accordingly. Here, as an example, the electronic device 120 may be a projector disposed on a vehicle such as a car to project an image.

Figure 2A:
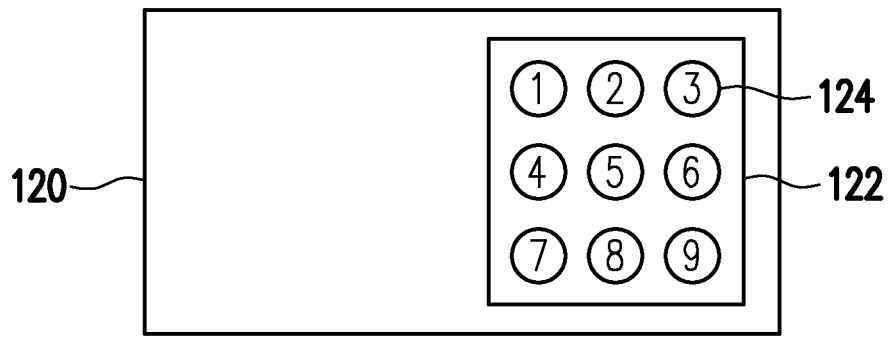
FIG. 2A is a schematic view of an electronic device according to an embodiment of the disclosure.

FIG. 2A is a schematic view of an electronic device according to an embodiment of the disclosure. As shown in FIG. 2A, the electronic device 120 has an interface 122 including a plurality of pogo pads 124. The pogo pads 124 of the electronic device 120 may be coupled with the pogo pins of the control device 110 described later. Here, nine pogo pads 124 are illustrated; however, the actual amount and the actual configuration of the pogo pads 124 may be adjusted according to the practical need and design. In addition, the interface for coupling the electronic device 120 and the control device 110 is the pogo pads 124 only, so there is no need to provide additional holes in the electronic device 120 for the connectors conforming to various specifications as described in the section of DESCRIPTION OF RELATED ART. Accordingly, functions like dust-proof and water-proof of the electronic device 120 may be improved.

As shown in FIG. 1, the control device 110 is used to perform at least one preset operation on the electronic device 120. The preset operation is, for example, a firmware update of the electronic device 120. The control device 110 may further include a control circuit 112 and a pogo-pin module 114. The control circuit 112 is coupled to the pogo-pin module 114 to control the pogo-pin module 114. The pogo-pin module 114 is adapted as the interface, which may be coupled with the pogo-pads 124 of the electronic device 120.

Figure 2B:
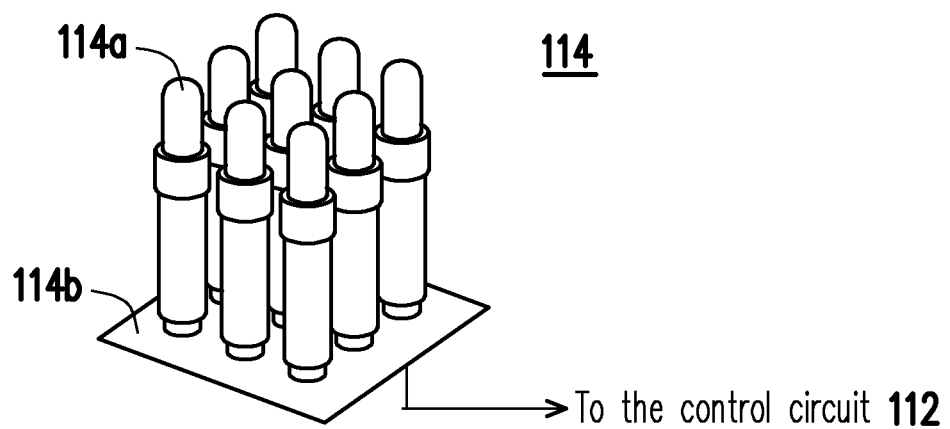
FIG. 2B is a schematic diagram of the structure of a pogo-pin module of a control device.

FIG. 2B is a schematic diagram of the structure of the pogo-pin module of the control device. As shown in FIG. 2B and FIG. 1, the pogo-pin module 114 may include a plurality of pogo pins 114a. Each of the pogo pins 114a forms a one-to-one correspondence with the aforementioned pogo pads 124 of the electronic device 120, and the correspondence may be connected via contact or disconnected. The pogo pins 114a may be configured on a pogo-pin base 114b and be electrically connected to the control circuit 112 through the pogo-pin base 114b. That is, the control circuit 112 may control the pogo pins 114a. When the pogo pins 114a are in contact with the pogo pads 124, a signal transmission path is provided, through which the control device 110 receives an external signal (sent from the computer 200 and the signal converter 210) and transmits the signal through the pogo pins 114a and the pogo pads 124 and further to the electronic device 120 to perform an operation corresponding to the signal on the electronic device 120.

Figure 2C:
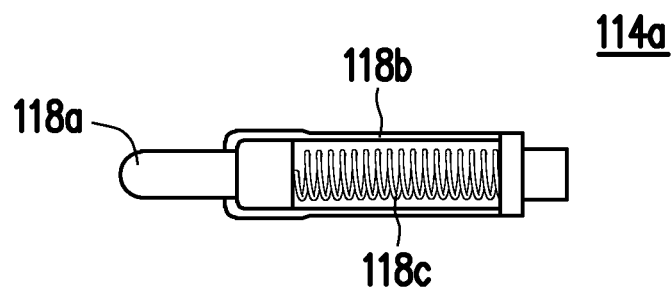
FIG. 2C is a schematic diagram of the structure of a pogo pin.

FIG. 2C is a schematic diagram of the structure of a pogo pin. The pogo pin 114a is basically a connector, which may be adapted for functions such as conduction and signal transmission. As shown in FIG. 2C, the pogo pin 114a is usually composed of a plunger 118a, a barrel 118b, and a spring 118c. The pogo pin 114a may contact the pogo pad 124 of the electronic device 120 as shown in FIG. 2A, thereby transmitting a signal from the control circuit 112 of the pogo pin 114a. When the control device 110 is not in contact with the electronic device 120, the plunger 118a of the pogo pin 114a is protruding. And when the control device 110 is in contact with the electronic device 120, the plunger 118a of the pogo pin 114a retracts to protect the interface of the electronic device 120 and ensure that the pogo pin 114a is indeed in contact. The pogo pin 114a shown in FIG. 2C is merely an example of the disclosure. In practice, a pogo pin having any kinds of structure may be adapted to the present disclosure.

Again in FIG. 1, in terms of the operation of the electronic-device control system, the control device 110 may receive a second specification signal S2 from outside, and the second specification signal S2 may be converted from a first specification signal S1. For example, the first specification signal S1 may be a universal serial bus (USB) signal, wherein the universal serial bus is one of the most commonly or currently used specification on general computers. In addition, the computer 200 may convert the first specification signal S1 into the second specification signal S2 through the signal converter 210 before providing the same to the control device 110. Here, the second specification signal S2 includes but is not limited to signals of the Joint Test Action Group (JTAG), the Serial Peripheral Interface (SPI), the Inter-Integrated Circuit (I2C), the General-Purpose input/output (GPIO), the Universal Asynchronous Receiver/Transmitter (UART), etc. In other words, as long as the signal meets the specification that allows the control device 110 to control or operate the electronic device 120, such signal may be adapted as the second specification signal S2.

Figure 3A:
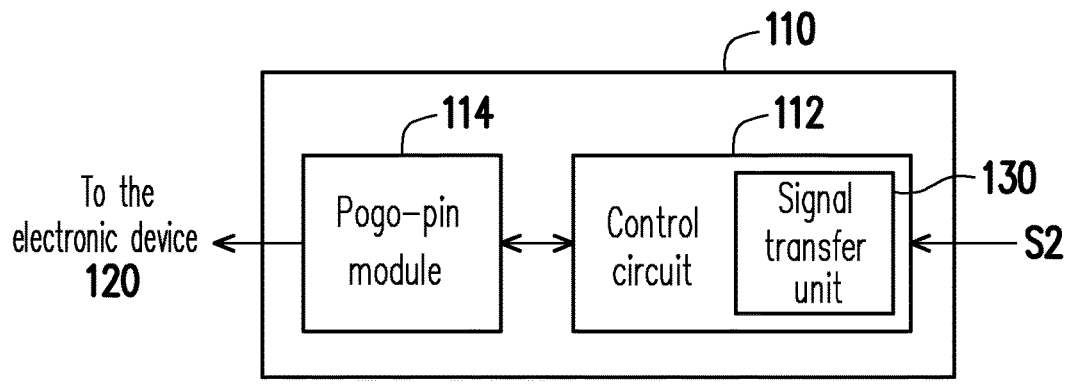
FIG. 3A is a block diagram of a control system according to an embodiment of the disclosure.

FIG. 3A is a block diagram of the control system according to an embodiment of the disclosure. As shown in FIG. 3A, the control circuit 112 of the control device 110 may include a signal transfer unit 130 for receiving from the external computer 200 the second specification signal S2 which is converted from the first specification signal S1, and transmitting the second specification signal S2 to the corresponding pogo pin among the plurality of pogo pins 114a.

As shown in FIG. 1 and FIG. 3A, the computer 200 may output the first specification signal S1 to the signal converter 210 through an USB interface. The signal converter 210 is, for example, a protocol converter, a host bus adapter (HBA), or other conversion circuits. The signal converter 210 converts the first specification signal S1 into the second specification signal S2 of specifications such as JTAG, I2C, GPIO, UART, etc. The second specification signal S2 is then provided to the control device 110. The control device 110 provides the second specification signal S2 to the signal transfer unit 130. And through the signal transfer unit 130, the pogo pin 114a corresponding to the second specification signal S2 among the plurality of pogo pins 114a may be in electrical contact with the corresponding pogo pad 124 of the electronic device. Through the correspondence between the pogo pin 114a and the pogo pad 124, the second specification signal S2 is transferred to the electronic device 120 to perform a corresponding control of or a corresponding operation on the electronic device 120, such as a firmware update, etc.

The signal transfer unit 130 may receive signals (such as the aforementioned signals like JTAG, SPI, I2C, GPIO, etc.) from cables of other devices, and transmit the signals to the pins corresponding to the actual pogo pins. The signal transfer unit 130 may be a hardware conversion structure such as a printed circuit board, or a hardware combination that includes a chip, etc. as long as it is hardware with a signal converting function that is easily understood by those in the art. In addition, the USB signal may also be converted into a signal for the electronic device 120 (such as the signal for a car projector; for example, the transmission/reception (TX/RX) of the UART signal), and the TX/RX signal is further transmitted to the pins corresponding to the actual pogo pins.

With such configuration, signals of different specifications may correspond respectively to their pogo pins 114a, and then through the pogo pins 114a in electrical contact with the pogo pads 124 of the electronic device 120, the signal is thereby transmitted by the signal transfer unit 130 to pass through the corresponding pogo pins 114a and the pogo pads 124 and further to the electronic device 120. The control device 110 may thereby control the electronic device.

In addition, the number of the pogo pins for each signal of different specification adapted as the second specification signal S2 is not the same. Therefore, in design, signals of different specifications may be configured with different number of pogo pins. In one embodiment, the pogo pins 114a of the pogo-pin module 114 may be divided into a plurality of pogo-pin groups, and each of the various specification signals adapted as the second specification signal S2 corresponds to one of the pogo-pin groups.

Basically, the pogo pins in each pogo-pin group are not shared by other pogo-pin groups. However, as long as there is no misoperation or that the signal may be accurately transmitted to the electronic device 120, each pogo-pin group may also share part of their pogo pins with other pogo-pin groups.

In general, the electronic-device control system 100 includes, for example, the control device 110 and the electronic device 120. The electronic device 120 includes the pogo pads 124 as the interface 122. The control device 110 performs at least one preset operation on the electronic device 120. The control device 110 may include the pogo-pin module 114 and the signal transfer unit 130. The pogo-pin module 114 includes the pogo pins 114a, and the pogo pins 144a correspond to the pogo pads 124 to form a one-to-one correspondence, and the correspondence may be connected via contact or disconnected. The signal transfer unit 130 receives from the external computer the second specification signal S2 which is converted from the first specification signal S1, and transmits the second specification signal S2 to the corresponding pogo pin among the plurality of pogo pins 114a.

Under such architecture, the connection interface between the electronic device 120 and the control device 110 adopts unique pogo pins and pogo pads. Therefore, when there is a need to control the electronic device 120 by using the control device 110, only the pogo-pin module 114 of the control device 110 needs to be in contact with the pogo pads of the electronic device 120. Thus, the electronic device 120 does not need to be provided with additional holes to meet the specifications of different signals. Accordingly, the electronic device 120 has better dust-proof and waterproof functions to be adopted in a stricter environment.

In addition, since the connection interface between the electronic device 120 and the control device 110 does not adopt a general interface such as USB or other interfaces like JTAG, SPI, I2C, GPIO, etc., the electronic device 120 is not susceptible to external malicious damage, including the malicious firmware update, control, or operation of the car projector acting as the electronic device 120.

Figure 3B:
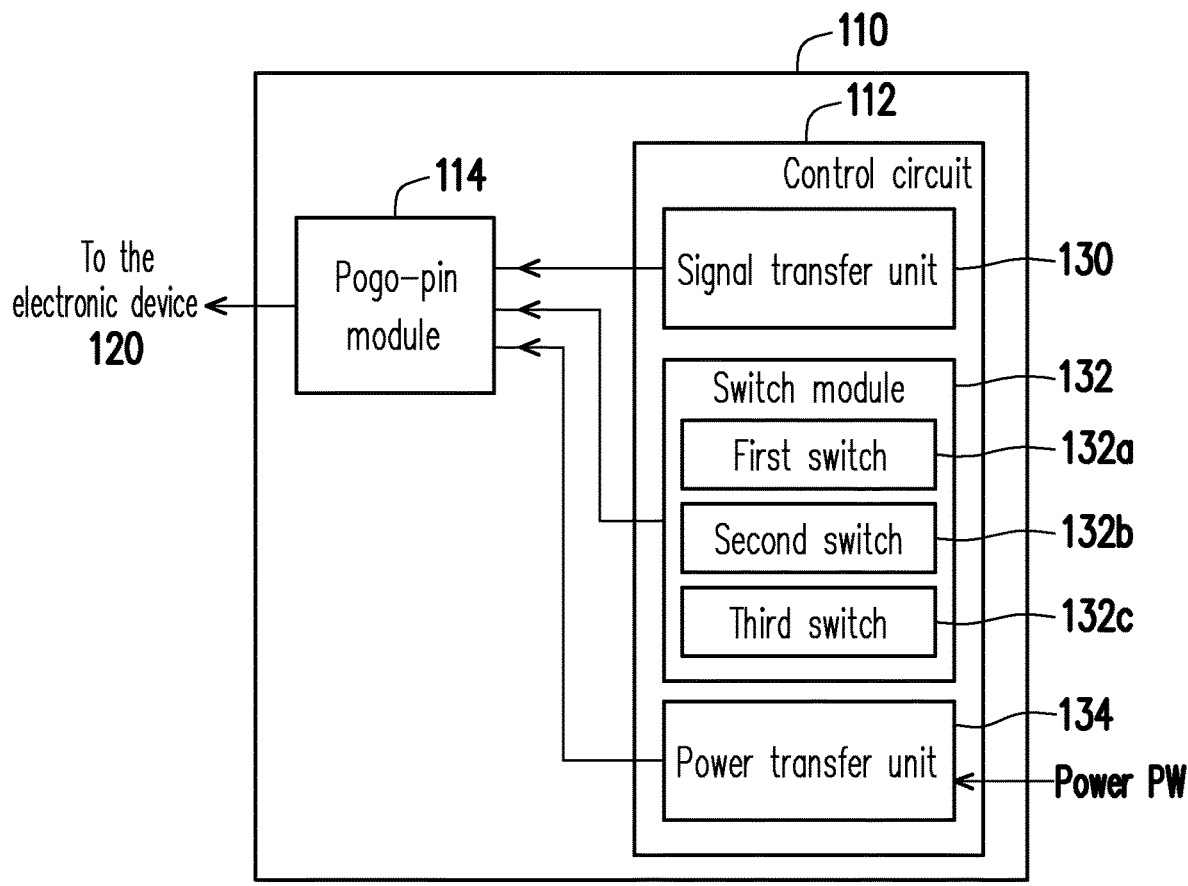
FIG. 3B is a block diagram of a control system according to another embodiment of the disclosure.

FIG. 3B is a block diagram of a control system according to another embodiment of the disclosure. As shown in FIG. 3B, the control circuit 112 of the control device 110 may further include a switch module 132. The switch module 132 may be composed of a plurality of switches, including a first switch 132a, a second switch 132b, and a third switch 132c. The number of the switches in the switch module 132 is not particularly defined, as the number may correspond to the number of the types of operation achieved by the control device 110.

In the control device 110 shown in FIG. 3A, the control device 110 only performs the preset operations, such as updating the firmware of the electronic device 120. However, in the structure of FIG. 3B, different switches, namely the first switch 132a, the second switch 132b, and the third switch 132c, may correspond to different operations. In addition, the first switch 132a, the second switch 132b, and the third switch 132c also correspond respectively to the corresponding pogo pins 114a.

Under such architecture, by switching (turning on and off) the first switch 132a, the second switch 132b, and the third switch 132c, it is possible to toggle between different operations. For example, the switch 132a may be defined as a switch for firmware update mode, the switch 132b may be defined as a switch for control communication command mode, and the switch 132c may be defined as an output power setting. The first switch 132a, the second switch 132b, and the third switch 132c provide a user with freedom to define the operations of the control device 110, allowing the user to plan different operation modes of the control device 110 according to his needs. The switch module 132 basically also has the function of a signal transmission unit, which receives signals of the switch states of the first switch 132a, the second switch 132b, and the third switch 132c of the control device 110, and transmits the signals to the corresponding pogo pins 114a in the pogo-pin module 114.

Therefore, taking a car projector to be the electronic device 120 as an example, in the firmware update mode, when the user presses the switch 132a of the control device 110, the control device 110 adopts the second specification signal S2 (signals such as JTAG, SPI, I2C, GPIO, etc.) to update the firmware of the car projector. In addition, in the control communication command mode, when the user presses the switch 132b, the control device 110 controls the electronic device 120 via the USB interface to receive from the external computer 200 (as shown in FIG. 1) a control command, such as a command to have the car projector to project different images.

Therefore, under this architecture, the control device 110 of the present embodiment not only performs preset operations such as firmware updates on the electronic device 120, but may also switch between different modes by using the first switch 132a, the second switch 132b, and the third switch 132c, etc. Such architecture allows the user to define the operation types by himself, and the control device 110 may thus perform various operations.

In addition, as shown in FIG. 3B, the control device 110 may further include a power transfer unit 134, which is also coupled to the pogo-pin module 114. The power transfer unit 134 may receive an external power PW from outside the control device 110. Through the power transfer unit 134, the external power PW is transferred to the corresponding pogo pin 114a, and through the interface of the pogo pin 114a and the pogo pad 124, the power PW is transferred to the electronic device 120. Under this architecture, the power transfer unit 134 directly transfers the received power PW to the electronic device 120.

Figure 3C:
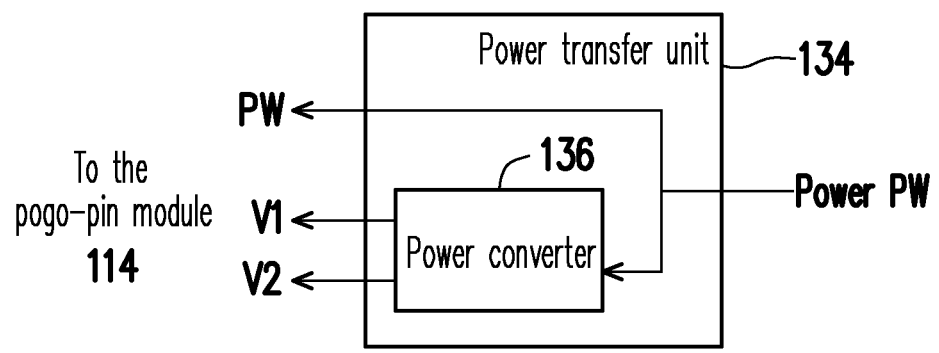
FIG. 3C is a block diagram of a power transfer unit according to an embodiment of the disclosure.

FIG. 3C is a block diagram of a power transfer unit according to an embodiment of the disclosure. The power transfer unit 134 shown in FIG. 3B directly transfers the received power PW to the corresponding pogo pin 114a without converting the received power PW. However, the control device 110 may also convert the received power PW. As shown in FIG. 3C, the power transfer unit 134 may include a power converter 136 for converting the power PW into at least one different potentials. In this example, it is converted into two potentials V1 and V2, and the converted potentials V1 and V2 are provided to the electronic device 120 through the corresponding pogo pins 114a.

In the embodiment mentioned above, the control device 110 may include the switch module 132 and the power transfer unit 134 at the same time, or it may include only one of the two. The configuration may be modified according to the needs of the user.

Figure 4:
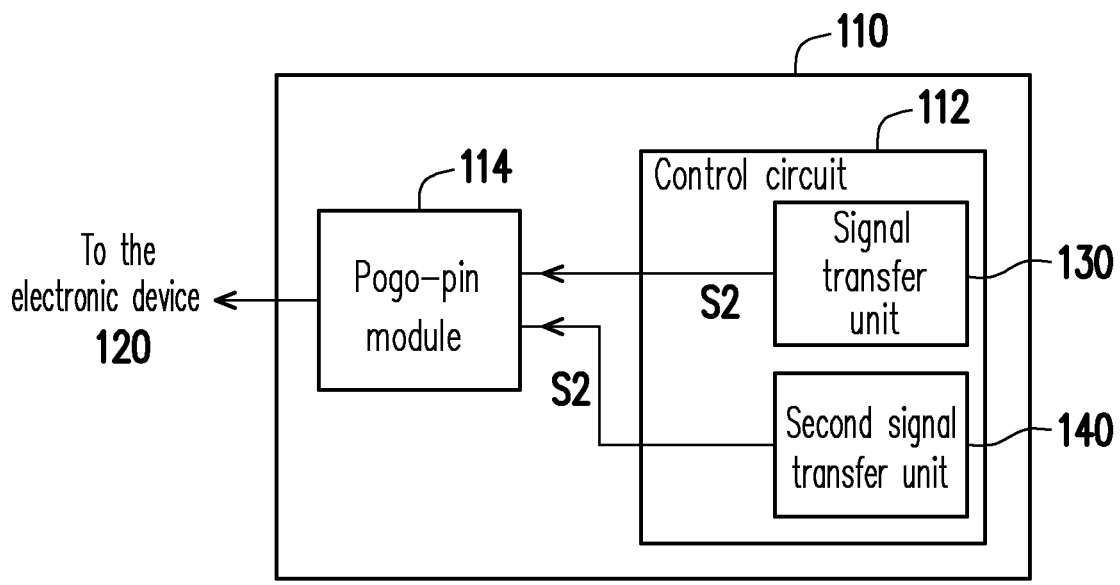
FIG. 4 is a block diagram of an electronic-device control system according to another embodiment of the disclosure.

FIG. 4 is a block diagram of an electronic-device control system according to another embodiment of the disclosure. As shown in FIG. 4, the control device 110 may include a second signal transfer unit 140. In this embodiment, the signal transfer unit (a first signal transfer unit) 130 may be adapted to convert an USB signal into an UART specification signal usable by the electronic device 120 such as a car projector, and the second signal transfer unit 140 may receive, for example, an USB signal and convert the same into the second specification signal S2, such as JTAG, SPI, I2C, GPIO, and other specification signals. Both the signal transfer unit 130 and the second signal transfer unit 140 may transfer the received signal to the corresponding pogo pins 114a.

In addition, in the embodiment shown in FIG. 4, the control device 110 may also include both or one of the switch module 132 and the power transfer unit 134. The power transfer unit 134 may also be configured to transfer the received power PW directly or to transfer the converted potentials to the corresponding pogo pins 114a.

Figure 5:
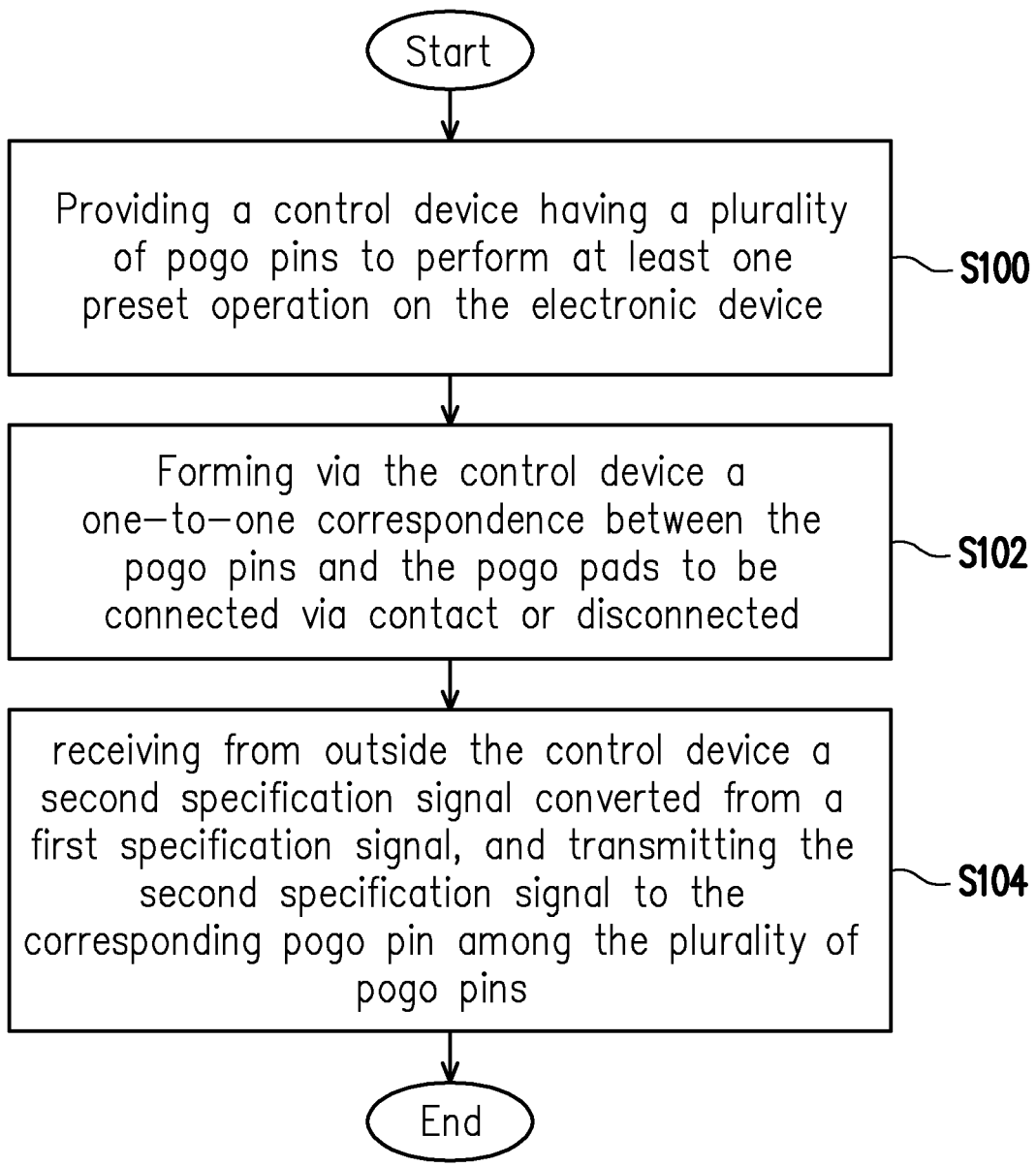
FIG. 5 is a flow chart of an electronic-device control method according to an embodiment of the disclosure.

FIG. 5 is a flow chart of an electronic-device control method according to an embodiment of the disclosure. The control method of this embodiment may be adapted to control an electronic device including multiple pogo pads acting as an interface. The electronic device may be, for example, a car projector, but is not limited thereto.

As shown in FIG. 5, first, in step S100, a control device having a plurality of pogo pins is provided for performing at least one preset operation on the electronic device. The control device may be the control device 110 as shown in FIG. 1, FIG. 3A to FIG. 3C, or FIG. 4.

Next, in step S102, through the control device, the pogo pins and a plurality of pogo pads form a one-to-one correspondence to be connected via contact or disconnected. The electronic device includes the pogo pads. The pogo pads of the electronic device may be coupled with the pogo pins of the control device. In an embodiment, step 102 further includes a switching (turning on and off) operation of a switch to perform a firmware update mode operation or to perform a setting operation such as a communication command mode operation on the electronic device.

In step S104, a second specification signal converted from a first specification signal is received from outside the control device, and the second specification signal is transmitted to the corresponding pogo pin among the plurality of pogo pins. Accordingly, the interface for coupling the electronic device and the control device is merely the pogo pads, so there is no need to provide additional holes in the electronic device for connectors with various specifications of signals as described in the section of DESCRIPTION OF RELATED ART. And functions like dust-proof and water-proof of the electronic device may be improved accordingly. In one embodiment, step 104 further includes an operation of the electronic device performing a firmware update or projecting different images based on the received second specification signal.

In summary, by adapting the pogo pins as the interface between the electronic device and the control device, the uniqueness is given to the interface of the electronic-device control system and the method of the present disclosure, such that the signals become difficult to be cracked, improving the security of the electronic device. In addition, through the interface of the pogo-pins, electronic devices such as a car projector do not need to be welded or provided with holes to install connectors such as USB, RS232, RJ45, etc., so that costs may be saved and damage may be prevented.

Furthermore, since there is no need to provide holes in the electronic device to install the connectors, the dustproof and waterproof functions may also be better provided. As the number of the pogo pins may be adjusted to increase or decrease the contact points of the pins and that the functions may also be defined according to the needs of the user, the control device has a high degree of freedom in use.

However, the descriptions above are only the preferred embodiments of the present application and do not limit the scope of implementation of the present application, that is, all simple equivalent modifications made in accordance with the claims and the content of the present application are within the scope of the present application. In addition, any embodiment or claim of the disclosure is not required to achieve all the objectives or advantages or features disclosed in the present application. Also, the abstract and the title of the present application are only used to assist the retrieval of patent documents, not to limit the scope of claims of the present application. Furthermore, the terms "first," "second," and the like mentioned in the specification or the claims are used only to name the elements or to distinguish different embodiments or scopes and are not intended to limit the upper or lower limit of the number of the elements.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An electronic-device control system, comprising an electronic device and a control device, wherein:
    the electronic device comprises a plurality of pogo pads acting as an interface; and
    the control device is adapted to perform at least one preset operation on the electronic device, and the control device comprises a pogo-pin module and a signal transfer unit, wherein:
    the pogo-pin module comprises a plurality of pogo pins, the pogo pins correspond to the pogo pads to form a one-to-one correspondence to be connected via contact or disconnected, and
    the signal transfer unit is adapted to transmit a specification signal to at least one of the plurality of pogo pins,
    wherein the control device comprises a switch module, the switch module comprises a plurality of switches, each of the plurality of switches corresponds to corresponding pogo pins of the plurality of pogo pins, and the plurality of switches correspond respectively to a plurality of operation modes of the control device.

2. The electronic-device control system according to claim 1, wherein the specification signal transmitted by the signal transfer unit to the at least one of the plurality of pogo pins is a second specification signal, and the second specification signal comprises at least one of Joint Test Action Group signal, Serial Peripheral Interface signal, Inter-Integrated Circuit signal, General-Purpose input/output signal, and Universal Asynchronous Receiver/Transmitter signal.

3. The electronic-device control system according to claim 1, wherein the control device further comprises:
    a second signal transfer unit configured to receive from an external signal converter a signal of at least one specification comprising Joint Test Action Group, Serial Peripheral Interface, Inter-Integrated Circuit, and General-Purpose input/output to act as the specification signal transmitted by the signal transfer unit to the at least one of the plurality of pogo pins.

4. The electronic-device control system according to claim 1, wherein the operation modes at least comprise an update mode for updating the electronic device and a communication command mode.

5. The electronic-device control system according to claim 1, wherein the control device comprises a power transfer unit adapted for receiving a power and transmitting the power to the at least one of the plurality of pogo pins to supply the power to the electronic device.

6. The electronic-device control system according to claim 1, wherein the pogo pins are divided into a plurality of pogo-pin groups, the specification signal transmitted by the signal transfer unit to the at least one of the plurality of pogo pins comprises a signal of various specifications, and each of the pogo-pin groups corresponds to the signal of at least one specification.

7. The electronic-device control system according to claim 6, wherein the power transfer unit comprises a power converter adapted to convert the power into at least one different potentials and to provide the at least one potential to the electronic device.

8. The electronic-device control system according to claim 1, wherein the electronic device comprises a car projector.

9. An electronic-device control method, adapted to control an electronic device comprising a plurality of pogo pads acting as an interface, the electronic-device control method comprises:

provided a control device comprising a plurality of pogo pins, wherein the control device is adapted for performing at least one preset operation on the electronic device;

forming via the control device a one-to-one correspondence between the pogo pins and the pogo pads to be connected via contact or disconnected; and transmitting a specification signal to at least one of the plurality of pogo pins, wherein the control device comprises a plurality of operation modes, the operation modes at least comprise an update mode for updating the electronic device and a communication command mode, and the operation modes correspond respectively to a plurality of switches of the switch module.

10. The electronic-device control method according to claim 9, wherein the specification signal transmitted to the at least one of the plurality of pogo pins is a second specification signal, the second specification signal comprises at least one of Joint Test Action Group signal, Serial Peripheral Interface signal, Inter-Integrated Circuit, General-Purpose input/output signal, and Universal Asynchronous Receiver/Transmitter signal, and wherein the method further comprises converting a first specification signal into the second specification signal, and the first specification signal comprises a universal serial bus signal.

11. The electronic-device control method according to claim 9, further comprising:

receiving a signal of at least one specification comprising Joint Test Action Group, Serial Peripheral Interface, Inter-Integrated Circuit, and General-Purpose input/output to act as the specification signal transmitted to the at least one of the plurality of pogo pins.

12. The electronic-device control method according to claim 9, further comprising:

receiving a power via the control device, and transmitting the power to the at least one of the plurality of pogo pins to supply the power to the electronic device.

13. The electronic-device control method according to claim 12, further comprising:

converting the power into at least one different potentials, and providing the at least one potential to the electronic device.

14. The electronic-device control system according to claim 2, wherein the signal transfer unit is adapted to convert a first specification signal into the second specification signal and the first specification signal comprises a universal serial bus signal.

15. The electronic-device control system according to claim 3, wherein the second signal transfer unit is adapted to convert the first specification signal into the second specification signal, and transmit the second specification signal to the at least one of the plurality of pogo pins.

* * * * *